(12) United States Patent
Nambiar et al.

(10) Patent No.: US 11,074,093 B2
(45) Date of Patent: Jul. 27, 2021

(54) VIRTUAL MACHINE MIGRATION USING TRACKED ERROR STATISTICS FOR TARGET FIBRE CHANNEL PORTS

(71) Applicant: Hewlett Packard Enterprise Development LP, Houston, TX (US)

(72) Inventors: Padmaja C Nambiar, Bengaluru (IN); Sumangala Bannur Subraya, Bengaluru (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 218 days.

(21) Appl. No.: 16/015,110

(22) Filed: Jun. 21, 2018

(65) Prior Publication Data
US 2019/0391832 A1 Dec. 26, 2019

(51) Int. Cl.
*G06F 9/455* (2018.01)
(52) U.S. Cl.
CPC .. *G06F 9/45558* (2013.01); *G06F 2009/4557* (2013.01)
(58) Field of Classification Search
CPC ............ G06F 9/45558; G06F 2009/4557
See application file for complete search history.

(56) References Cited

U.S. PATENT DOCUMENTS

| 8,825,864 | B2 | 9/2014 | Li |
| 8,850,434 | B1 | 9/2014 | Butikofer |
| 9,176,788 | B2 | 11/2015 | Jadhav |
| 2008/0008202 | A1* | 1/2008 | Terrell ................ H04L 45/00 370/401 |
| 2014/0025861 | A1* | 1/2014 | Miyazawa .......... G06F 11/0769 710/316 |
| 2017/0039079 | A1* | 2/2017 | Nambiar ............. G06F 9/45558 |
| 2018/0300165 | A1* | 10/2018 | Johnson ............. G06F 9/45558 |
| 2019/0294351 | A1* | 9/2019 | Ahmed Sheriff ..... G06F 3/0635 |

FOREIGN PATENT DOCUMENTS

WO WO-2016154786 10/2016

OTHER PUBLICATIONS

Mayank Mishra, "Dynamic Resource Management Using Virtual Machine Migrations,", 7 pages, Indian Institute of Technology Bombay, IEEE Magazine, Sep. 10, 2012, 7 pages<http://www it iith ac in/~sahoo/papers/com magainze 2012. pdf>.

* cited by examiner

*Primary Examiner* — Camquy Truong
(74) *Attorney, Agent, or Firm* — Sheppard Mullin Richter & Hampton LLP (57) ABSTRACT

The disclosure relates to migration of virtual machines. In an example implementation, migration of a virtual machine (VM) is initiated from a source hypervisor to a destination hypervisor. A destination fibre channel (FC) port associated with the destination hypervisor is assigned to support a virtual initiator port of the VM upon migration, where the destination FC port is assigned using at least error statistics collected for the destination FC port. The VM is migrated from the source hypervisor to the destination hypervisor by supporting the virtual initiator port of the VM on the assigned destination FC port associated with the destination hypervisor.

12 Claims, 6 Drawing Sheets

VIRTUAL MACHINE MIGRATION USING TRACKED ERROR STATISTICS FOR TARGET FIBRE CHANNEL PORTS

BACKGROUND

Fibre Channel (FC) refers to a high-speed networking technology that may provide interconnection and communication between network elements. It is often used to connect computer data storage to servers because it provides reliable and lossless frame transport. For example, FC may be used in storage area networks (SAN) and data centers.

A FC storage network may include a FC fabric (e.g., network of one or more FC switches), an initiator (e.g., server with host bus adapter (HBA) card) to initiate connections over the FC fabric to one or more target ports on a storage system, and a target (e.g., target ports on the storage system that deliver storage volumes). Each port in a FC network may include a unique port identifier, sometimes referred to as a port World Wide Name (WWPN).

In a FC storage network environment, an N_port refers to a physical end node port on a FC fabric. For example, it may refer to a physical port of a HBA in a server or a target port on a storage array. N_Port ID Virtualization (NPIV) refers to a FC feature that allows a physical end node port on a FC fabric (N_Port) to be associated with more than one WWPN. In particular, NPIV allows for the creation of multiple virtual initiator ports, each with a unique WWPN as an identifier. These virtual initiator ports may communicate over the same physical N_port to communicate with devices in the storage network environment.

Each of the virtual initiator ports, sometimes referred to as NPIV virtual host bus adaptors (vHBAs) ports or virtual Fibre Channels (vFCs), may be associated with a virtual machine (VM) hosted by a physical computing system (e.g., a server). With NPIV in the storage network environment, the VMs along with the associated virtual initiator ports may migrate from one physical computing system to another physical computing system to transfer the workload between the physical computing systems. Migration of a VM may occur for a variety of reasons, including: to provide load balancing between the hosts, during maintenance windows/ upgrades of a host, to provide additional resources to a VM, including input/output (IO) bandwidth by adding new ports, etc.

BRIEF DESCRIPTION OF DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure.

DETAILED DESCRIPTION

As noted above, during migration of VMs in an environment that utilizes NPIV, the VMs along with their associated virtual initiator ports may be migrated from a source host system to a target host system. In some storage area network (SAN) environments, SAN level isolation may be provided for VMs by statically associating labels with each of the FC ports (e.g., physical HBA ports) serving each of the virtual initiator ports of the VMs. The associated labels may be indicative of a bandwidth availability (e.g., HBA speed, switch port speed, etc.) and/or FC fabric to which the FC port is connected. An advantage of this labeling approach is that it may serve to separate workloads by priority. In this manner, critical workloads may be separated from lower priority workloads (e.g., backups, testing, etc.)

Figure 1:
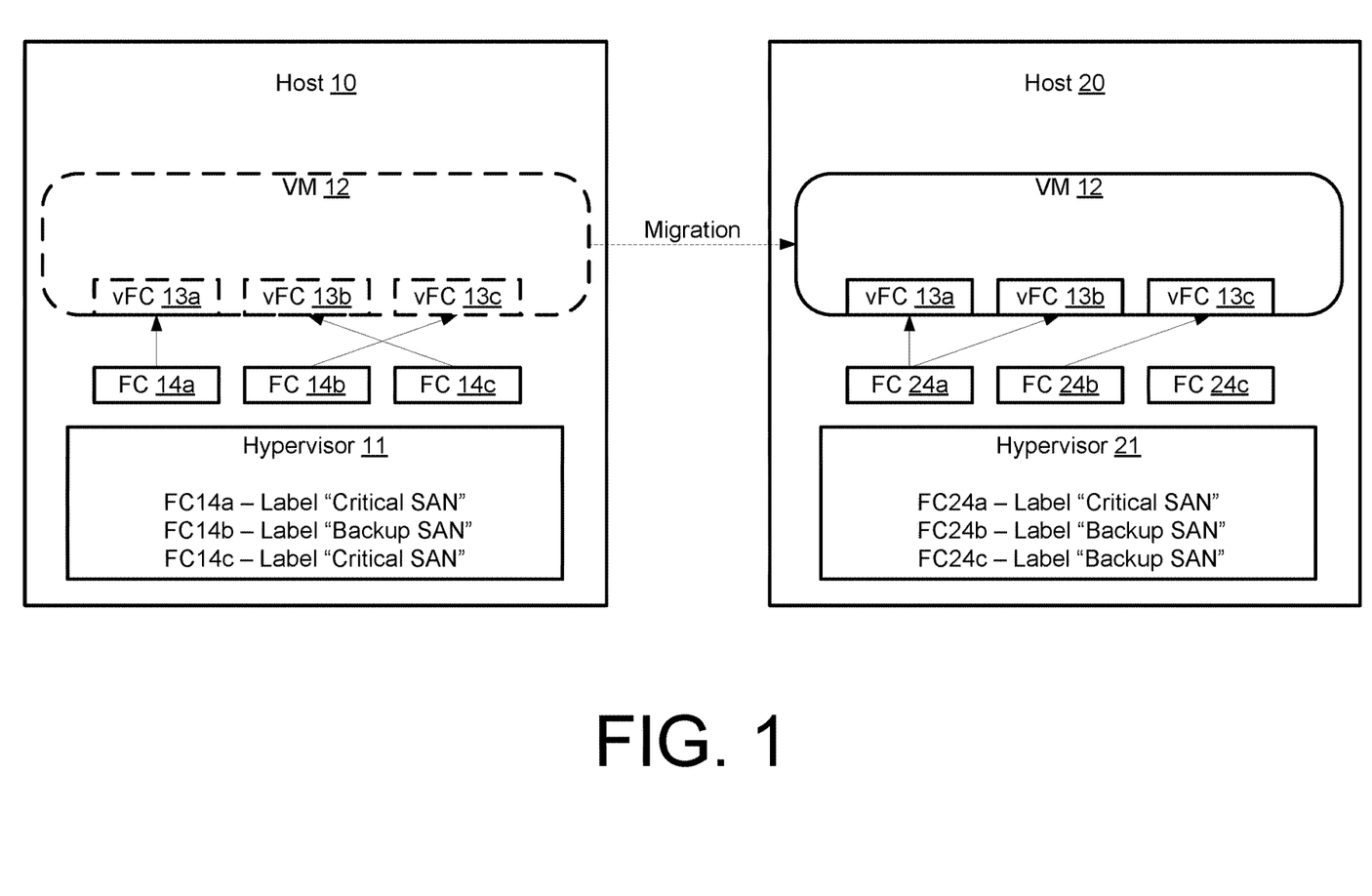
FIG. 1 illustrates an example VM migration process wherein the assignment of a destination physical FC port of the target host system to support the virtual initiator port of the VM upon migration is based on whether or not the destination FC port has the same label as the label associated with the source FC port.

During migration of a VM in a SAN environment that utilizes this labeling system, the assignment of a destination FC port (e.g., destination HBA port) of the target host system to support the virtual initiator port of the VM upon migration may be based on whether or not the destination FC port has the same label as the label associated with the source FC port. FIG. 1 illustrates this example migration process. As shown by FIG. 1, a host 10 includes physical FC ports FC 14a-14c and a hypervisor 11 that runs a VM 12 including vFCs 13a, 13b, and 13c. While VM 12 is run by hypervisor 11, vFC13a is placed on FC 14a, vFC 13b is placed on FC 14c, and vFC 13c is placed on FC 14b.

During migration of VM 12, hypervisor 11 of host 10 migrates VM 12 to hypervisor 21 of host 20. After migration, vFCs 13a-13b are placed on FC 24a of host 20, and vFC 13c is placed on FC 24b on host 20. During migration, hypervisor 11 may be configured to migrate each of vFCs 13a-13c to an FC port of host 20 having a label matching the FC port of host 10 on which the vFC was originally placed. For example, on host 10, vFC 13a is placed on an FC 14a having a "Critical SAN" label and vFC 13b is placed on an FC 14c also having a "Critical SAN" label. After migration of VM 12 to host 20, vFCs 13a and 13b are placed on an FC 24a of host 20 also having a "Critical SAN" label.

One potential limitation of this approach of associating static labels with the physical FC ports of the source and target hosts is that it may not account for the stability of the FC ports when the migration takes place. For example, although an FC port of a target host may normally be configured to provide critical workloads, if the FC port is malfunctioning (e.g., experiencing target port issues or PCI errors), it may not be able to appropriately serve a vFC of the migrated VM. As such, there is a need to account for the functionality of a FC port during VM migration.

To this end, implementations of the disclosure are directed to tracking, over time, errors associated with FC ports (e.g., HBA ports) to account for the stability and/or functionality of the ports at the time of VM migration. By virtue of dynamically monitoring the stability and functionality of the physical FC ports over time, it may be ensured that the VM migration occurs on the best set of available resources. In SAN environments, this may help ensure that virtual initiator ports of the migrating VM are predictably placed on the destination FC ports with similar performance characteristics or availability. This may help in achieving SAN-level isolation of the VMs and maintaining the performance and throughput for the VMs in the storage network environment.

Figure 2:
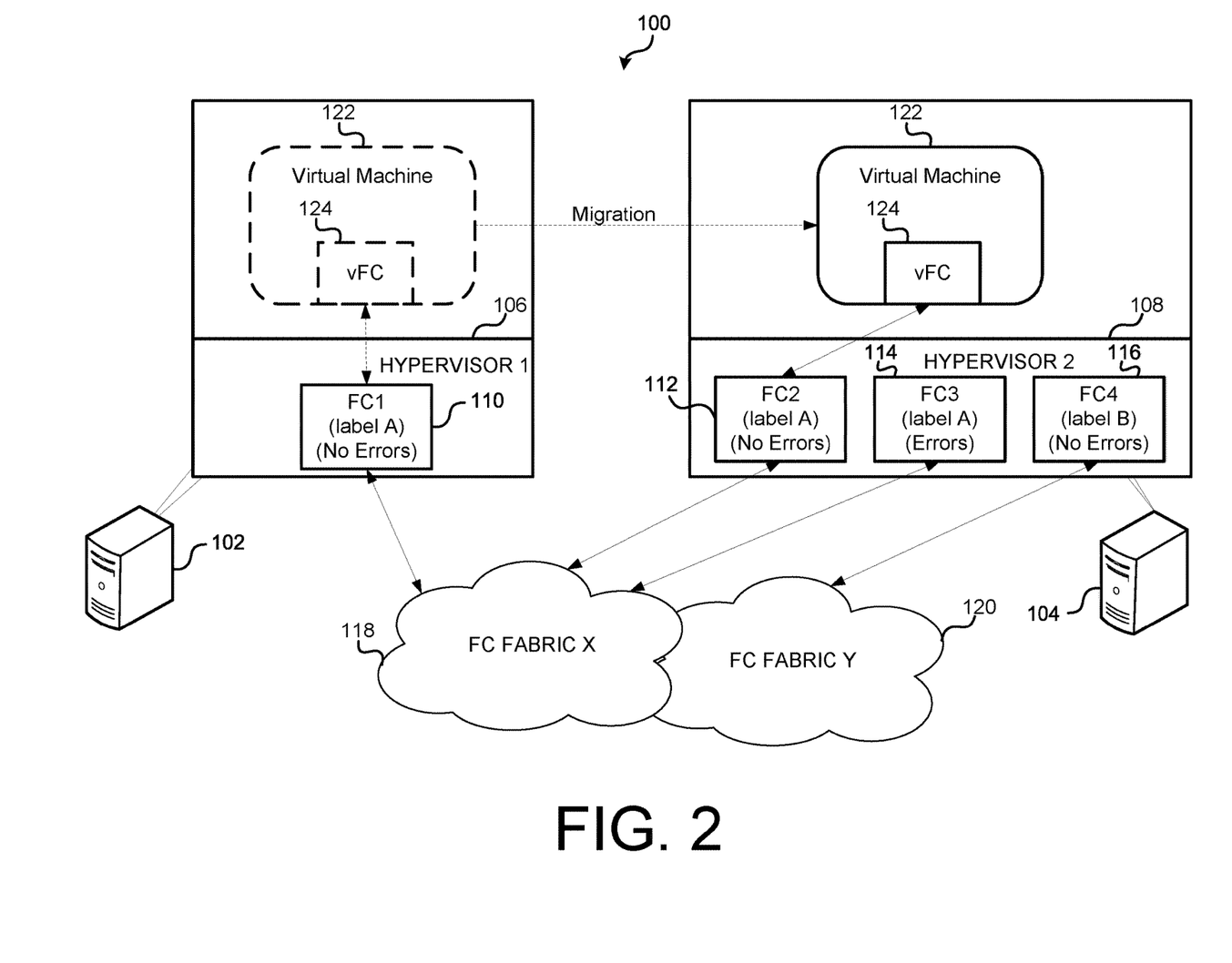
FIG. 2 illustrates VM migration in a storage network environment, according to an example implementation of the disclosure.

FIG. 2 illustrates VM migration in a storage network environment 100, according to an example implementation of the disclosure. As shown in FIG. 2, the storage network environment 100 includes host computing system 1, referenced by 102, and host computing system 2, referenced by 104. Host computing system 1, referred hereinafter as system 1 102, includes hypervisor 1 106 that creates and manages VMs on system 1. Similarly, host computing system 2, referred hereinafter as system 2 104, includes hypervisor 2 108 that creates and manages VMs on system 2. Each of system 1 102 and system 2 104 respectively includes one or more processors (not shown). Hypervisor 1 106 and hypervisor 2 108 are coupled to the processor(s) of system 1 and system 2, respectively, to perform functions for the migration of VMs in accordance with the disclosure. It may be noted that, for the sake of simplicity, only two host computing systems, system 1 and system 2, are shown in the storage network environment 100; however, the storage network environment 100 may include more than two host computing systems.

The processor(s) may be implemented as microprocessors, microcomputers, microcontrollers, digital signal processors, central processing units, state machines, logic circuitries, and/or any devices that manipulate signals based on operational instructions. Among other capabilities, the processor(s) may fetch and execute computer-readable instructions stored in a memory coupled to the processor(s) of system 1 and system 2. The memory can be internal or external to system 1 and system 2. The memory may include any non-transitory computer-readable storage medium including, for example, volatile memory (e.g., RAM), and/or non-volatile memory (e.g., EPROM, flash memory, NVRAM, memristor, etc.).

Further, each of system 1 102 and system 2 104 includes one or more FC ports associated with the respective hypervisor, each FC port being connected to a FC fabric. Each FC port may correspond to a physical port of a HBA (not shown) of the system. In such implementations, each system may have one or more HBAs, each HBA having one or more FC ports.

As shown in FIG. 2, system 1 102 includes one FC port, namely FC1 110, associated with hypervisor 1 106, and system 2 104 includes three FC ports, namely FC2 112, FC3 114, and FC4 116, associated with hypervisor 2 108. FC1 110, FC2 112, and FC3 114 are connected to FC fabric X 118, and FC4 116 is connected to FC fabric Y 120. FC fabric X 118 and FC fabric Y 120 overlap each other, as shown in FIG. 2. Thus, FC fabric X 118 and FC fabric Y 120 are part of the same FC fabric. It may be noted that one FC port and three FC ports are shown for system 1 and system 2 as an example; however, system 1 and system 2 may include any number of FC ports.

The FC ports associated with hypervisor 1 106 and hypervisor 2 108 are assigned with labels. A label may be a tag, for example, an alpha-numeric name. The labels may be assigned by a system administrator. In an example, the same label is assigned to the FC ports, associated with different hypervisors, which at least have the same bandwidth availability and are connected to the same FC fabric. Consider a case where FC1 110, FC2 112, and FC3 114 have the same high bandwidth availability, and FC4 116 has different and lower bandwidth availability. Since FC1 110, FC2 112, and FC3 114 are connected to FC fabric X and have the same bandwidth availability, they are assigned the same label, for example, "label A", as shown. FC4 116, however, which is connected to FC fabric Y, is assigned a different label, for example, "label B", as shown, since it is connected to a different FC fabric and has a lower bandwidth availability.

Further, in an example, two or more FC ports associated with the hypervisors may also be assigned the same label when at least one of the speed, the vendor, and the load-based priority, associated with the FC ports is the same. The load-based priority of a FC port may indicate whether the FC port is to be reserved for a critical load over the SAN, a backup load over the SAN, a test load over the SAN, and such.

Error statistics are tracked over time for each of the FC ports associated with hypervisor 1 106 and hypervisor 2 108. For example, consider a FC port of a HBA. Over time, any of the subsystems associated with a HBA may experience errors such as firmware errors, cable/small form factor (SFP) issues, interconnect module errors, Peripheral Component Interconnect (PCI) errors, driver internal resource errors, etc.

Each hypervisor 1 106 and hypervisor 2 108 may collect error statistics at regular intervals for each of its associated FC ports and/or for the HBA as a whole. The statistics may be collected from a HBA corresponding to the FC port. Each driver of an HBA may monitor its hardware, internally maintain error statistics and export data including error statistics to the hypervisor. A hypervisor may collect these error statistics at regular intervals via system calls such as input/output controls (ioctls). In particular implementations, a hypervisor may subscribe for notifications when there is an error statistic increment in the driver. In such implementations, a notification sent to the hypervisor may include details such as an identification of an error (i.e., errorID), a severity of the error, etc. In some implementations, groups of related errors may grouped by ID. For example, link level errors may be grouped with a single ID. A hypervisor may subscribe to receive notifications regarding errors when a vFC is created. Error counters may be maintained for each vFC and physical HBA associated with it.

In some implementations, each hypervisor may subscribe to Web-Based Enterprise Management (WBEM) events from which error statistics associated with FC ports may be gathered. For example, a hypervisor may subscribe for the events from the providers that generate the WBEM events for FC ports. When the WBEM Provider generates the event, it reaches the hypervisor. The hypervisor may then increment an error statistic maintained in its database. WBEM Indication may include an identification of an error, severity of error, group ID/type of error, etc.

In particular implementations, the presence of an error may be tracked over time windows (i.e., an interval of time having a predetermined length). The length of the time window may be user-configurable. During each time window, an error counter may be incremented each time an error is observed during the time window. If an error is not observed during the time window, the error counter may be reset to zero to provide an indication that no error has been recently observed for the FC port.

In some implementations, error statistics tracked for each FC port may categorized into two or more error categories.

The error categories may be indicative of an error level. In a particular implementation, "critical" and "non-critical errors" may be separately tracked. For example, a "critical error" may refer to an error that may cause downtime of the FC port such as a non-recoverable firmware fault, a PCI error, a switch error, etc. A "non-critical error" may refer to an error that generates a warning event such as a recoverable firmware fault that can be recovered with an HBA reset, unavailability of internal resources, target queue full conditions, etc. Where multiple categories or types of errors are tracked, the aforementioned time window-based error-tracking process may be performed for each tracked error.

In some implementations, the labels assigned to the FC ports may be dynamically updated over time using at least the error statistics that are collected. The labels may be updated in response to detecting or not detecting errors. By way of example, consider the case of FC3 114, which may be initialized with a "label A" indicating a high bandwidth availability and no errors. Over time, hypervisor 2 116 may begin to receive error statistics from a driver associated with FC 114 that indicates that noncritical errors are occurring during operation of FC3 114. For example, an error counter may indicate that one or more non-critical errors have occurred during a most recent time interval. In response, hypervisor 2 116 may update the assigned label to "label A-E1" to indicate that FC3 114 has a high bandwidth availability, but that noncritical errors have been recently detected. If critical errors are subsequently detected during operation of FC3 114, hypervisor 2 116 may again update the assigned label to "label A-E2" to indicate that although FC3 114 has a high bandwidth availability, critical errors have been recently detected. Thereafter, if the errors are resolved (e.g., by manual user intervention) and/or if no errors are detected over a time window (e.g., most recent time window), the assigned label of FC3 114 may again be updated to the original "label A" indicating a high bandwidth availability and no errors.

The description below describes the procedure of migration of a VM 122 from hypervisor 1 106 of system 1 to hypervisor 2 108 of system 2 based on the labels assigned to the FC ports, and errors tracked for the FC ports, in accordance with an example implementation of the disclosure. Consider a case where the VM 122 on hypervisor 1 106 is associated with a virtual initiator port, namely vFC 124. The vFC 124 of the VM 122 is supported by FC1 110. For the purpose of description herein, hypervisor 1 106 may be referred to as the source hypervisor, FC1 110 may be referred to as the source FC port, hypervisor 2 108 may be referred to as the destination hypervisor, and FC2 112, FC3 114, and FC4 116 may be referred to as the destination FC ports.

For migration of the VM 122 from hypervisor 1 to hypervisor 2, hypervisor 1 may send information of the migrating VM 122 and the vFC 124, and the label associated with the source FC port, i.e., FC1 110, to hypervisor 2. The information and the label of FC1 110 received by hypervisor 2 may be stored in a memory (not shown) of system 2.

In an example implementation, hypervisor 2 identifies the label associated with FC1 110. Hypervisor 2 then identifies at least one candidate FC port among a plurality of FC ports associated with hypervisor 2, where the at least one candidate FC port has the same label as the identified label. After identifying the at least one candidate FC port, hypervisor 2 then identifies at least one eligible FC port from the at least one candidate FC ports, where the at least one eligible FC port is not associated with any recently tracked errors (e.g., errors tracked over a most recent time window). Hypervisor 2 then places the vFC 124 of the VM 122 on one of the eligible FC ports to migrate the VM 122 from hypervisor 1 to hypervisor 2.

With the example implementation shown in FIG. 2, hypervisor 2 108 identifies label A as the label associated with FC1 110. Based on the label, hypervisor 2 108 identifies FC2 112 and FC3 114 as the candidate FC ports having the same label as label A. Hypervisor 2 108 then identifies FC 112 as the eligible FC port having no recently tracked errors. Thus, hypervisor 2 108 places the vFC 124 of the VM 122 on FC2 112 to migrate the VM 122, as shown in FIG. 2.

By placing the vFC 124 on FC2 112 having the same label as FC1 110, the VM 122 may be migrated to a destination FC port that is connected to the same FC fabric and has the same bandwidth availability as that for a source FC port prior to migration. Additionally, by placing the vFC 124 on FC2 112 that is determined to be error free, reliability/stability of the new FC port may be ensured. Thus, the VM 122 prior to and after the migration can experience and provide a similar performance.

In an example implementation, hypervisor 2 determines connectivity of FC2 112 to FC fabric X 118 prior to placing the vFC 124 of the VM 122 on FC2 112. The connectivity of the FC2 112 to FC fabric X 118 is determined to check that whether the FC2 112 is actually connected to the same FC fabric as that connected with the FC1 110. If FC2 112 is not actually connected to FC fabric X 118, then the vFC 124 is not placed on FC2 112. This determination helps in preventing placement of a virtual initiator port on a destination FC port in case the destination Fc port is assigned an incorrect label with respect to connectivity to the same FC fabric.

Further, in an example implementation, consider the case where there is at least one candidate FC port having a same label as the source FC port, but none of the at least one candidate FC port is identified as being error free. In this case, migration of the VM may be delayed (e.g., in the case of an offline migration) until at least one candidate FC port is identified as being error free. Alternatively, VM migration may be canceled. This may help prevent placement of a virtual initiator port on a destination FC port that is unstable or nonfunctional. Alternatively, in this case the virtual initiator port may be placed on a destination FC port that is determined to have noncritical errors that are unlikely to compromise stability/functionality. For example, candidate FC ports may be ranked using at least error tracking statistics as described herein, and the destination hypervisor may place the virtual initiator port on the destination FC port having the highest rank (e.g., lowest level error). In some implementations, ranking and priority policies may be altered by a user of the system. These policies may be specified in XML may be used by the destination hypervisor.

Further, in an example implementation, in case two or more FC ports associated with hypervisor 2 are identified as eligible FC ports, hypervisor 2 may place the vFC 124 of the VM 122 on one of the eligible FC ports that has a minimum number of previously placed and active virtual initiator ports. Thus, the vFC of the migrating VM is placed on a destination FC port that is least loaded with virtual initiator ports. Such placement of the vFC substantially ensures even distribution of workloads on the eligible destination FC ports for the migrating VMs.

Further, in an example implementation, consider a case where a migrating VM is associated with at least two virtual initiator ports supported by one or more source FC ports on the source hypervisor, and at least two destination FC ports associated with the destination hypervisor are identified as eligible destination FC ports having the same label as that for the one or more source FC ports. In this case, the destination hypervisor may place the at least two virtual initiator ports on the at least two identified eligible destination FC ports such that the same identified eligible destination FC port is not consecutively assigned to the at least two virtual initiator ports. Such a placement of vFCs of the migrating VM may help in preventing a single point of failure for the VM.

Figure 3:
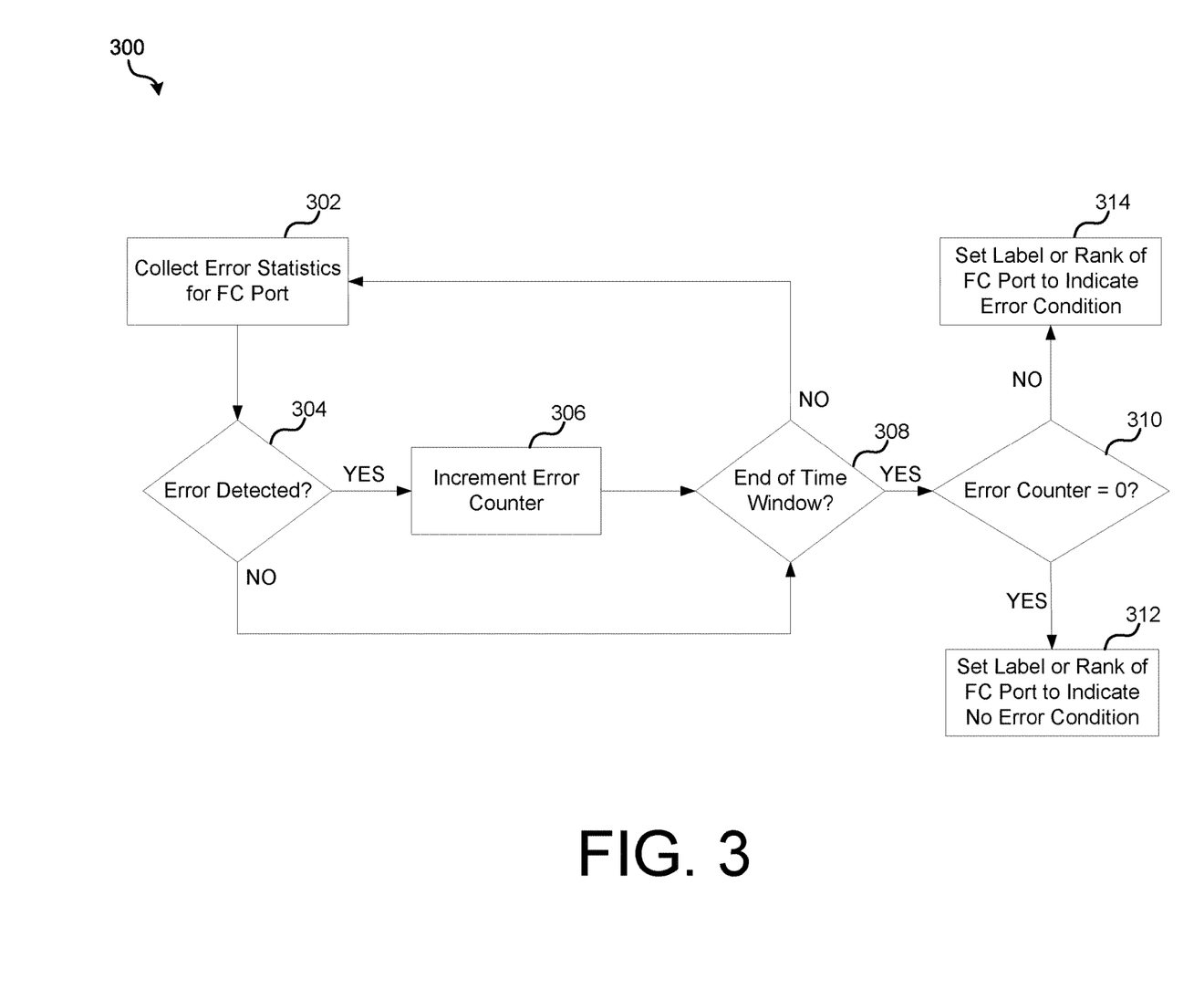
FIG. 3 is an operational flow diagram illustrating a method for dynamically tracking errors in a FC port over a time window and updating a ranking or label of the FC port, according to an example implementation of the disclosure.

FIG. 3 is an operational flow diagram illustrating a method 300 for dynamically tracking errors in a FC port over a time window and updating a ranking or label of the FC port, according to an example implementation of the disclosure. The order in which the method 300 is described is not intended to be construed as a limitation, and any number of the described method operations can be combined to implement the method 300. Furthermore, the method 300 can be implemented by processor(s) or computing device(s) through any suitable hardware, a non-transitory machine readable medium, or combination thereof. Further, although the method 300 is described in context of the aforementioned host computing system of the storage network environment 100, other suitable computing devices or systems may be used for execution of the method 300. It may be understood that processes involved in the method 300 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 3, at operation 302, error statistics are gathered for an FC port. For example, a destination hypervisor may gather error statistics for a port of a HBA. The error statistics may be collected from a driver of an HBA port that monitors the HBA's hardware and exports data including error statistics to the hypervisor. In some implementations, the destination hypervisor may collect the error statistics for the FC port using a subscription to receive WBEM events.

At decision 304, using at least the collected error statistics, it is determined if an error was detected. If so, an error counter may be incremented (operation 306). If not, it is determined whether the time window has ended (decision 308). Operations 302-308 may iterate until the end of the time window.

Thereafter, at decision 310 it is determined if errors were detected during the time window (e.g., error counter set to zero). If errors were not detected, at operation 312, a label or rank of the FC port may be set to indicate that no error condition has been detected for the FC port during a most recent time window. For example, the FC port may be assigned the highest level rank available for its label. As another example, the label of the FC port may be modified to indicate that the FC port has not experienced errors.

If errors were detected, at operation 314, a label or rank of the FC port may be set to indicate that an error condition has been detected for the FC port during a most recent time window. For example, the FC port may be assigned a rank indicative of the type of error that was detected and/or the number of times an error was detected. As another example, the label of the FC port may be modified to indicate that the FC port has experienced errors.

It should be noted that although method 300 illustrates a method for dynamically tracking errors in a FC port over a given time window, method 300 may be iterated over multiple time windows to track errors in the FC port and update a label or rank associated with the FC port. Additionally, it should be appreciated that although method illustrates a method that may cause a single error counter to be incremented, in some implementations a plurality of different error counters may be incremented. For example, an error counter for critical errors or an error counter for non-critical errors may be incremented depending on the type of error that is detected. In such implementations, the label or rank that is set for the FC port may depend on the type of error counter that was incremented. It should also be noted that in the example of method 300, for the beginning of each new time window, the error counter may be reset to zero.

Figure 4:
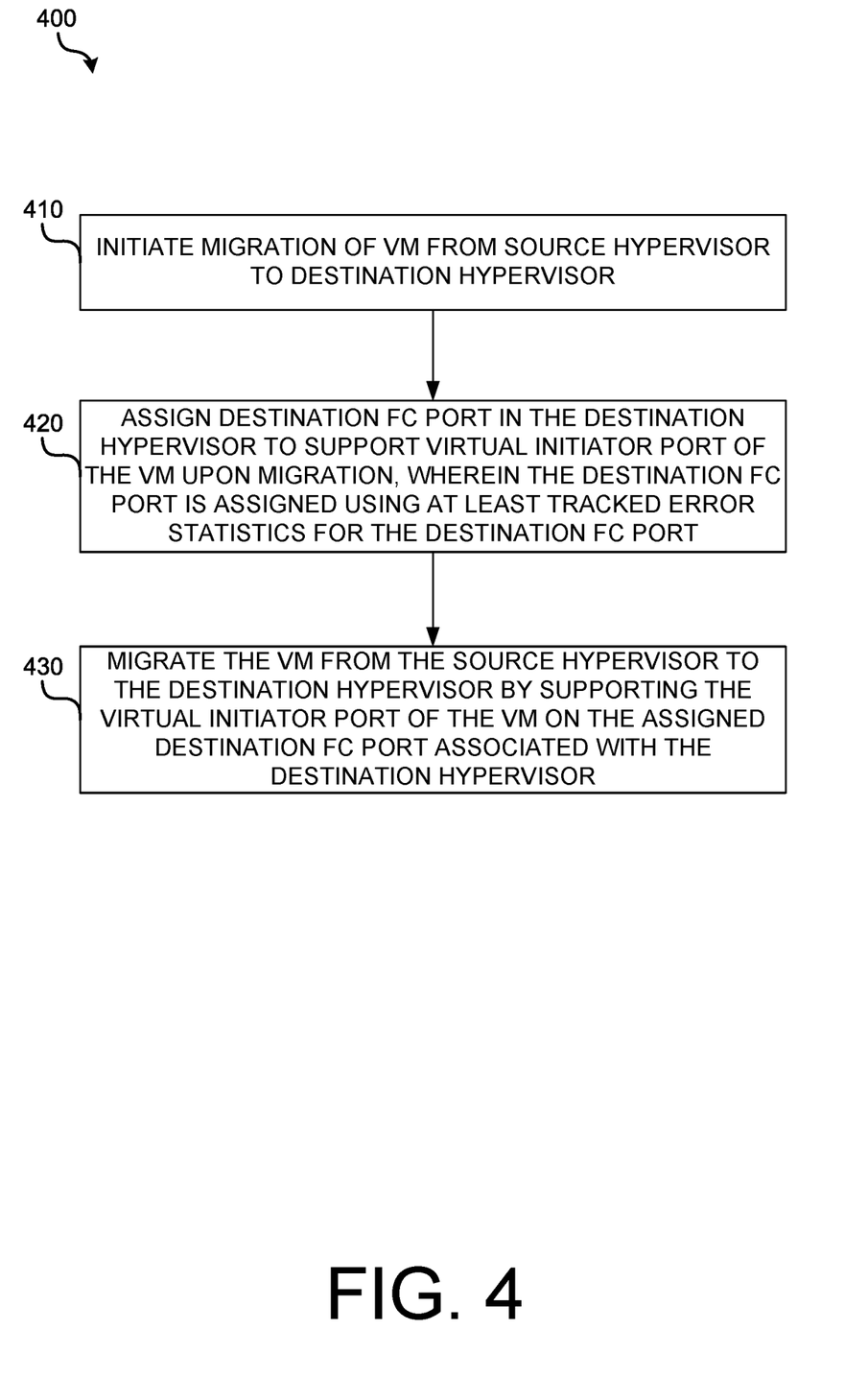
FIG. 4 is an operational flow diagram illustrating a method for VM migration from a source hypervisor to a destination hypervisor in a storage network environment, according to an example implementation of the disclosure.

FIG. 4 is an operational flow diagram illustrating a method 400 for VM migration from a source hypervisor to a destination hypervisor in a storage network environment, according to an example implementation of the disclosure. The order in which the method 400 is described is not intended to be construed as a limitation, and any number of the described method operations can be combined to implement the method 400. Furthermore, the method 400 can be implemented by processor(s) or computing device(s) through any suitable hardware, a non-transitory machine readable medium, or combination thereof. Further, although the method 400 is described in context of the aforementioned host computing system of the storage network environment 100, other suitable computing devices or systems may be used for execution of the method 400. It may be understood that processes involved in the method 400 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 4, at operation 402, migration of a VM from a source hypervisor to a destination hypervisor is initiated. For example, migration may be initiated by a user or by a computing system to provide load balancing between the source and destination hypervisors, in response to a maintenance or upgrade event at the source host, to provide additional resources to the VM, or for some other reason.

At operation 404, a destination FC port (e.g., HBA port) associated with the destination hypervisor is assigned to support a virtual initiator port of the VM upon migration. The destination FC port is assigned using at least tracked error statistics for the destination FC port. The error statistics for the destination port may be tracked by the destination hypervisor as discussed above. In some implementations, the tracked error statistics may indicate that no errors have been detected for the destination port over a time window, and the destination FC port may be assigned using at least this indication.

In some implementations, the tracked error statistics may indicate that the destination FC port has a higher ranking than another destination port having the same label, where the label is indicative of at least: same FC fabric to which the source FC port and the destination FC port are connected. For example, the tracked error statistics may indicate that the assigned destination port FC port has not experienced any errors over a recent time window whereas another destination port FC port having the same label has experienced errors over the recent time window. As another example, the tracked error statistics may indicate that the assigned destination port FC port has experienced only non-critical errors over a recent time window whereas another destination port FC port having the same label has experienced critical errors over the recent time window.

At operation 406, the VM is migrated from the source hypervisor to the destination hypervisor by supporting the virtual initiator port of the VM on the assigned destination FC port associated with the destination hypervisor. The VM migration is completed by the destination hypervisor.

Figure 5:
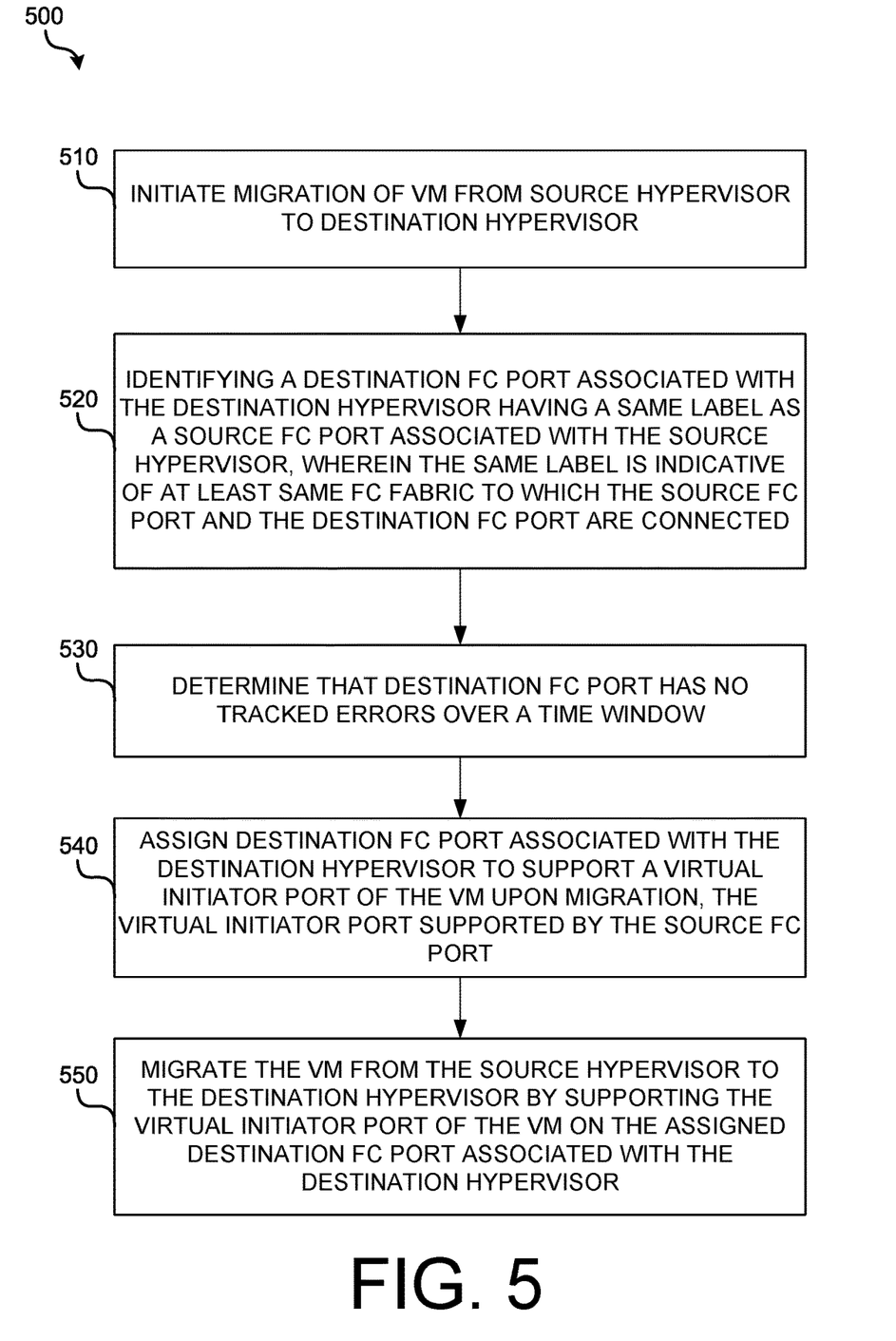
FIG. 5 is an operational flow diagram illustrating an example method for VM migration from a source hypervisor to a destination hypervisor in a storage network environment, according to an example implementation of the disclosure.

FIG. 5 is an operational flow diagram illustrating an example method 500 for VM migration from a source hypervisor to a destination hypervisor in a storage network environment, according to an example implementation of the disclosure. The order in which the method 500 is described is not intended to be construed as a limitation, and any number of the described method operations can be combined to implement the method 500. Furthermore, the method 500 can be implemented by processor(s) or computing device(s) through any suitable hardware, a non-transitory machine readable medium, or combination thereof. Further, although the method 500 is described in context of the aforementioned host computing system of the storage network environment 100, other suitable computing devices or systems may be used for execution of the method 500. It may be understood that processes involved in the method 500 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 5, at operation 510, migration of a VM from a source hypervisor to a destination hypervisor is initiated.

At operation 520, a destination FC port associated with the destination hypervisor having a same label as a source FC port associated with source hypervisor is identified, where the same label is indicative of at least a same FC fabric to which the source FC port and the destination FC port are connected. In some implementations, the same label may also be indicative of same bandwidth availability on the source FC port and the destination FC port. In implementations, this identification may be made by the destination hypervisor. For example, the source hypervisor may send at least the label of the source FC port to the destination hypervisor, and the destination hypervisor may identify a destination FC port having the same label.

At operation 530, a determination is made that the destination FC port has no tracked errors over a time window. For example, the destination hypervisor may determine that the destination FC port has no tracked errors over the time window using at least a ranking of the destination FC port, where the ranking of the FC port is indicative of an error status of the destination port that has been tracked by the destination hypervisor. As another example, the destination hypervisor may determine that the destination FC port has no tracked errors over the time window by reference to an error counter that is set to zero.

At operation 540, using at least the determination that the destination FC port has no tracked errors over the time window, the destination FC port is assigned to support a virtual initiator port upon migration, where the virtual initiator port is supported by the source FC port prior to migration.

At operation 550, the VM is migrated from the source hypervisor to the destination hypervisor by supporting the virtual initiator port of the VM on the assigned destination FC port associated with destination hypervisor. The VM migration is completed by the destination hypervisor.

Figure 6:
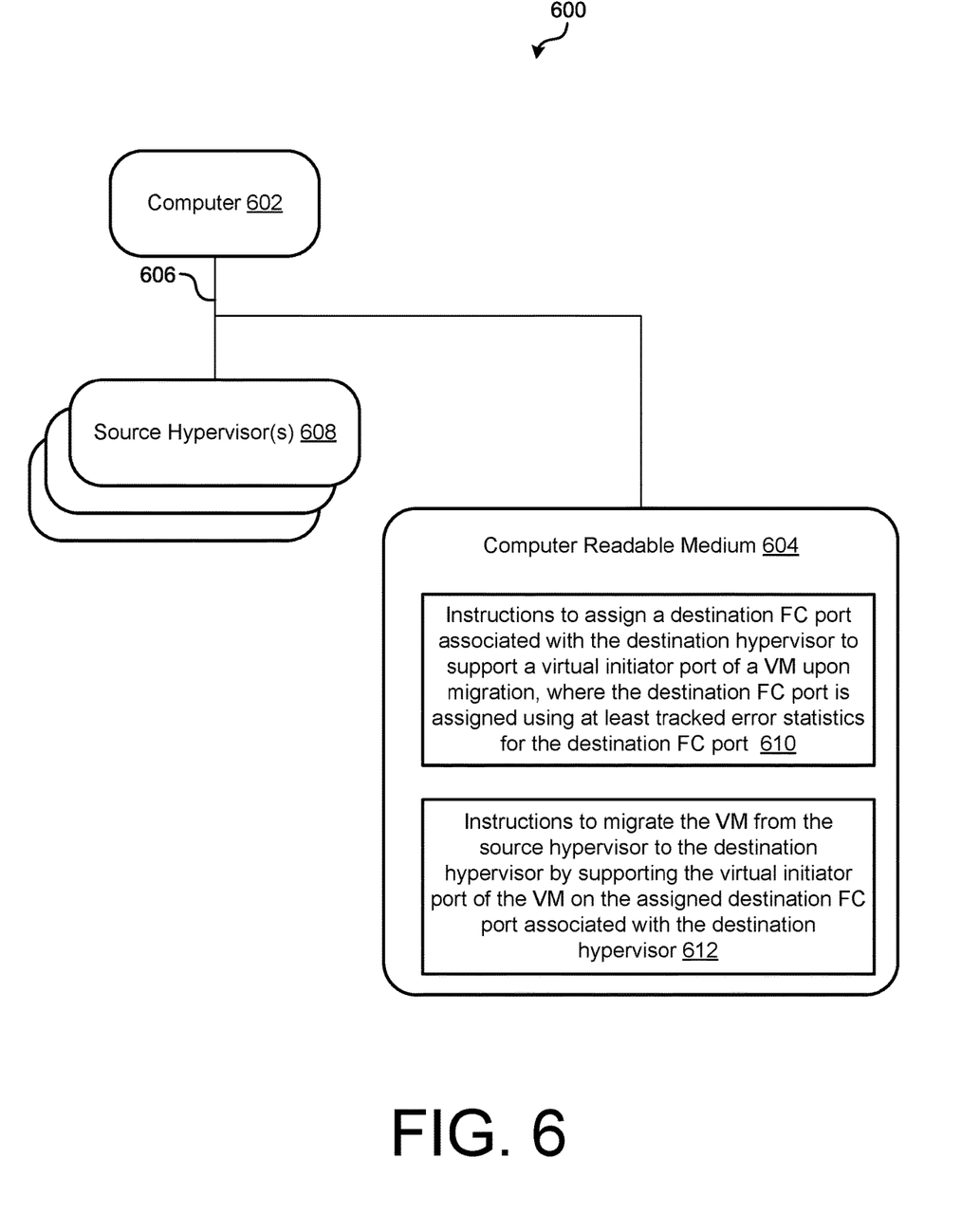
FIG. 6 illustrates a system environment, according to an example implementation of the disclosure.

FIG. 6 illustrates a system environment 600, according to an example implementation of the disclosure. In an example implementation, the system environment 600 includes a computer 602 communicatively coupled to a non-transitory computer readable medium 604 through a communication link 606. The computer 602 has one or more processing resources for fetching and executing computer-readable instructions from the non-transitory computer readable medium 604.

In an example implementation, the computer 602 may be a host computer that hosts a destination hypervisor to which a VM is to be migrated from a source hypervisor. Thus, the computer 602 and the non-transitory computer readable medium 604 are also communicatively coupled to source hypervisor(s) 608, for migration of a VM from the source hypervisor(s) 608 to the destination hypervisor of the computer 602.

The non-transitory computer readable medium 604 can be, for example, an internal memory device or an external memory device. In an example implementation, the communication link 606 may be a direct communication link, such as any memory read/write interface. In another example implementation, the communication link 606 may be an indirect communication link, such as a network interface. In such a case, the computer 602 can access the non-transitory computer readable medium 604 through a network (not shown). The network may be a single network or a combination of multiple networks and may use a variety of different communication protocols.

In an example implementation, the non-transitory computer readable medium 604 includes a set of computer readable instructions for migration of VMs from a source hypervisor(s) 608 to the destination hypervisor of the computer 602. The set of computer readable instructions can be accessed by the computer 602 through the communication link 606 and subsequently executed to perform operations for migration of VMs.

Referring to FIG. 6, in an example, the non-transitory computer readable medium 604 includes instructions 610 that cause the computer 602 to assign a destination FC port associated with destination hypervisor to support a virtual initiator port of a VM upon migration, where the destination FC port is assigned using at least tracked error statistics for the destination FC port.

The non-transitory computer readable medium 604 further includes instructions 612 that cause the computer 602 to migrate the VM from the source hypervisor to the destination hypervisor by supporting the virtual initiator port of the VM on the assigned destination FC port associated with destination hypervisor.

In an example implementation, the non-transitory computer readable medium 604 may further include instructions that cause the computer 602 to identify a destination FC port associated with the destination hypervisor having a same label as a source FC port associated with the source hypervisor, where the same label is indicative of at least: a same FC fabric to which the source FC port and the destination FC port are connected. In some implementations, the same label may also be indicative of same bandwidth availability on the source FC port and the destination FC port.

In an example implementation, the non-transitory computer readable medium 604 may further include instructions that cause the computer 602 to determine that a destination FC port has no tracked errors over a time window.

In an example implementation, the non-transitory computer readable medium 604 may further include instructions that cause the computer 602 to, upon determining that the destination FC port has no tracked errors over a time window, assign a destination FC port associated with the destination hypervisor to support a virtual initiator port of the VM upon migration, the virtual initiator port supported by the source FC port.

In an example implementation, the non-transitory computer readable medium 604 may further include instructions that cause the computer 602 to perform a method for dynamically tracking errors in a FC port over a time window and updating a ranking or label of the FC port. For example, the instructions may cause the computer 602 to perform method 300.

Although implementations for VM migration from a source hypervisor to a destination hypervisor in an NPIV-based storage network environment have been described in language specific to structural features and/or methods, it is to be understood that the disclosure is not limited to the specific features or methods described. Rather, the specific features and methods are disclosed and explained as example implementations for VM migration from a source hypervisor to a destination hypervisor.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A non-transitory computer-readable medium having executable instructions stored thereon that, when executed by a processor, perform operations of:

identifying a destination fibre channel (FC) port associated with a destination hypervisor having a same label as a source FC port associated with the source hypervisor, wherein the same label is indicative of at least a same FC fabric to which the source FC port and the destination FC port are connected;

determining that the destination FC port has no tracked errors over a time window;

using at least the determination that the destination FC port has no tracked errors over the time window, assign the destination FC port to support a virtual initiator port of a virtual machine (VM) upon migration of the VM from the source hypervisor to the destination hypervisor, the virtual initiator port supported by the source FC port prior to migration;

migrating the VM from the source hypervisor to the destination hypervisor by supporting the virtual initiator port of the VM on the assigned destination FC port associated with the destination hypervisor; and tracking error statistics over a time window for each of a plurality of destination FC ports associated with the destination hypervisor by iteratively performing the following operations over the time window for each of the plurality of destination FC ports: collecting error statistics for the destination FC port; determining from the collected statistics if an FC port error is present; and if an FC port error is present, incrementing an error counter.

2. The non-transitory computer-readable medium of claim 1, wherein the destination FC port is a port of a host bus adapter (HBA) of a host comprising the destination hypervisor.

3. The non-transitory computer-readable medium of claim 1, wherein the instructions, when executed by the processor, further perform an operation of: collecting error statistics that are used to determine that the destination FC port has no tracked errors, wherein the error statistics are collected by the destination hypervisor.

4. The non-transitory computer-readable medium of claim 3, wherein the destination hypervisor collects the error statistics from a driver of a host bus adapter (HBA) associated with the destination FC port.

5. The non-transitory computer-readable medium of claim 3, wherein the destination hypervisor collects the error statistics using a subscription to Web-Based Enterprise Management (WBEM) events.

6. A method, comprising:

initiating migration of a virtual machine (VM) from a source hypervisor to a destination hypervisor;

assigning a destination fibre channel (FC) port associated with the destination hypervisor to support a virtual initiator port of the VM upon migration, wherein the destination FC port is assigned using at least error statistics collected for the destination FC port;

migrating the VM from the source hypervisor to the destination hypervisor by supporting the virtual initiator port of the VM on the assigned destination FC port associated with the destination hypervisor; and collecting the error statistics over a time window by iteratively performing the following operations over the time window: collecting error statistics for the destination FC port; determining from the collected statistics if an FC port error is present; and if the FC port error is present, incrementing an error counter.

7. The method of claim 6, wherein the collected error statistics indicate that no errors have been detected for the destination FC port over a time window, wherein the destination FC port is assigned using at least the indication that no errors have been detected for the destination FC port over the time window.

8. The method of claim 6, wherein the collected error statistics indicate that the destination FC port has a higher ranking than another destination port in the hypervisor having a same label indicative of at least a fabric to which an FC port is connected.

9. The method of claim 8, wherein the label is also indicative of bandwidth availability of another FC port.

10. The method of claim 6, wherein the destination FC port is a port of a host bus adapter (HBA) of a host comprising the destination hypervisor.

11. The method of claim 10, wherein the method further comprises: the destination hypervisor collecting the error statistics from a driver of the HBA.

12. The method of claim 6, wherein the method further comprises: the destination hypervisor collecting the tracked error statistics using a subscription to Web-Based Enterprise Management (WBEM) events.

\* \* \* \* \*